(12) United States Patent
Wakatsuki

(10) Patent No.: US 7,917,290 B1
(45) Date of Patent: Mar. 29, 2011

(54) METHOD AND APPARATUS FOR AUTOMATIC POINT OF INTEREST CREATOR FROM CONTACT LIST FOR GPS UNITS

(75) Inventor: Kenichiro Wakatsuki, Irving, TX (US)

(73) Assignee: Uniden America Corporation, Fort Worth, TX (US)

( * ) Notice: Subject to any disclaimer, the term of this patent is extended or adjusted under 35 U.S.C. 154(b) by 1015 days.

(21) Appl. No.: 11/653,514

(22) Filed: Jan. 16, 2007

(51) Int. Cl.
*G01C 21/00* (2006.01)

(52) U.S. Cl. .................. 701/213; 701/208; 340/995.18

(58) Field of Classification Search .......... 701/207–213; 340/988, 990, 995, 995.1, 995.18
See application file for complete search history.

(56) References Cited

U.S. PATENT DOCUMENTS

| | | | |
|---|---|---|---|
| 6,317,687 B1 * | 11/2001 | Morimoto et al. ............ | 701/211 |
| 7,043,362 B2 | 5/2006 | Krull et al. | |
| 2004/0054428 A1 | 3/2004 | Sheha et al. | |
| 2005/0114021 A1 * | 5/2005 | Krull et al. .................... | 701/211 |

* cited by examiner

*Primary Examiner* — Richard M. Camby
(74) *Attorney, Agent, or Firm* — Baker & McKenzie LLP

(57) ABSTRACT

A GPS unit receives a list of contacts from an external source and automatically processes the list of contacts, creating a point of interest for each contact in the list of contacts and saving the created points of interest in a point of interest database.

4 Claims, 8 Drawing Sheets

METHOD AND APPARATUS FOR AUTOMATIC POINT OF INTEREST CREATOR FROM CONTACT LIST FOR GPS UNITS

BACKGROUND

1. Field of the Invention

The present invention relates to global positioning satellite systems and radar detection system.

2. Description of Related Art

Positional tracking systems have been around for many years. One popular type of positional tracking system is a global positioning satellite (GPS) system. GPS systems use a network of satellites that transmit signals to GPS receivers on the ground. The GPS receivers receive the signals and convert the signals into physical coordinates. In recent years, these GPS systems have become widely available for general consumer use. GPS systems are now available in small portable units with high-resolution display screens that users can take with them while they are traveling from one place to another.

One reason for the increased popularity of these GPS systems is that mapping software has been developed that works with the GPS coordinates to allow users with GPS receivers to locate their current physical positions relative to known surroundings. Users can now navigate from place to place, locate restaurants and other sites of interest, and plan routes from one location to another. The mapping software usually includes detailed graphical representations of streets, buildings, sites of interest, emergency facilities, and the locations of selected commercial establishments. The software often includes "live" voice data to guide the user along the user's chosen route.

Most GPS systems come with software that contains points of interest (POIs) or have POIs pre-loaded on the GPS systems. POIs usually represent gas stations, parks, recreational facilities, restaurants, hotels, and similar sites of interest. In some instances, various companies or organizations will maintain a database of POIs on an Internet website. These POIs may be downloaded from the website and incorporated into the list of POIs already stored on the GPS system. In most GPS systems, POIs remain in memory until deleted by the user or until overwritten by updates to the map software.

GPS systems also allow for data points called "waypoints." Waypoints, also referred to as "via" points, are used in electronic map or GPS applications as intended destinations and intermediate destinations, and may be used to plot routes from one location to another. Waypoints may also represent side trips on a longer route. Waypoints, in general, can be any identified location, including the coordinates for a physical location or an electronic map feature. Electronic map features are locations that are associated with other information, such as, a name, an address, a telephone number, and the like, for a particular location. Waypoints must be created one at a time, and are not stored in the memory of the GPS system indefinitely. Waypoints are automatically removed from the memory of the GPS system either after the route has been completed, or after a short period of time. Because of the temporary nature of waypoints, GPS systems only provide a limited amount of memory for waypoints. As such, only a limited number of waypoints may be associated with any one route or temporarily stored on the GPS system at any one time.

In some GPS systems, data representing personal contacts, such as data contained in an electronic address book, may be loaded into the GPS system. When such contact data is loaded into a GPS system, it is treated as a waypoint. As such, the contact data is not stored in the GPS system indefinitely. Thus, the contact data must be loaded into the GPS system one item at a time. Then, because the contact data is stored as a waypoint, only a small number of contact data items can be loaded into the GPS system, and any contact data that is loaded into the GPS system will only be stored temporarily. Thus, the contact data must be re-entered into the GPS system each time it is needed.

Some GPS systems also allow for the creation of data points called "favorites." Favorites are locations that are bookmarked in the GPS system. Typically, favorites are created one at a time. As with waypoints, GPS systems only provide a limited amount of memory for favorites. Favorites can be used as starting points, destination points, or waypoints on a route. Favorites, which can be actively edited or deleted, are semi-permanent in nature, i.e., once the number of stored favorites reaches a maximum amount, the next new favorite will overwrite a previously stored favorite.

Therefore, although the use of POIs, waypoints, and favorites represent great strides in the functionality of GPS systems, many shortcomings remain.

BRIEF DESCRIPTION OF THE DRAWINGS

FIGS. 3A-3E are orthographic views of one physical configuration of the method and apparatus disclosed herein, wherein FIG. 3A is a front view, FIG. 3B is a rear view, FIG. 3C is a left side view, FIG. 3D is a right side view, and FIG. 3E is a bottom view.

DETAILED DESCRIPTION

Figure 1:
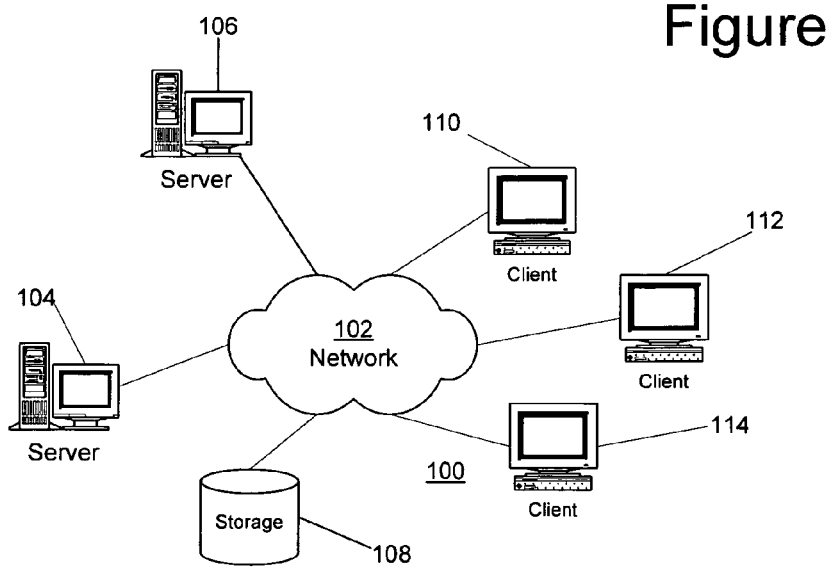
FIG. 1 is a pictorial representation of a network of data processing systems in which exemplary aspects of the method and apparatus disclosed herein may be implemented.
Figure 2:
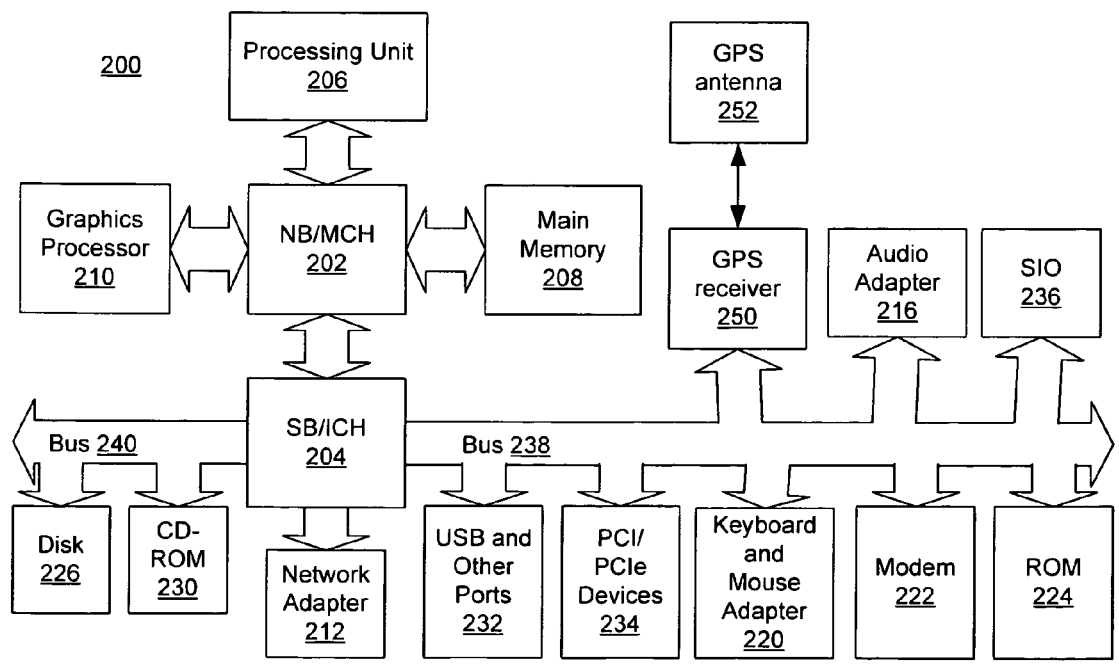
FIG. 2 is a block diagram of a data processing system in which exemplary aspects of the method and apparatus disclosed herein may be implemented.
Figure 3A:
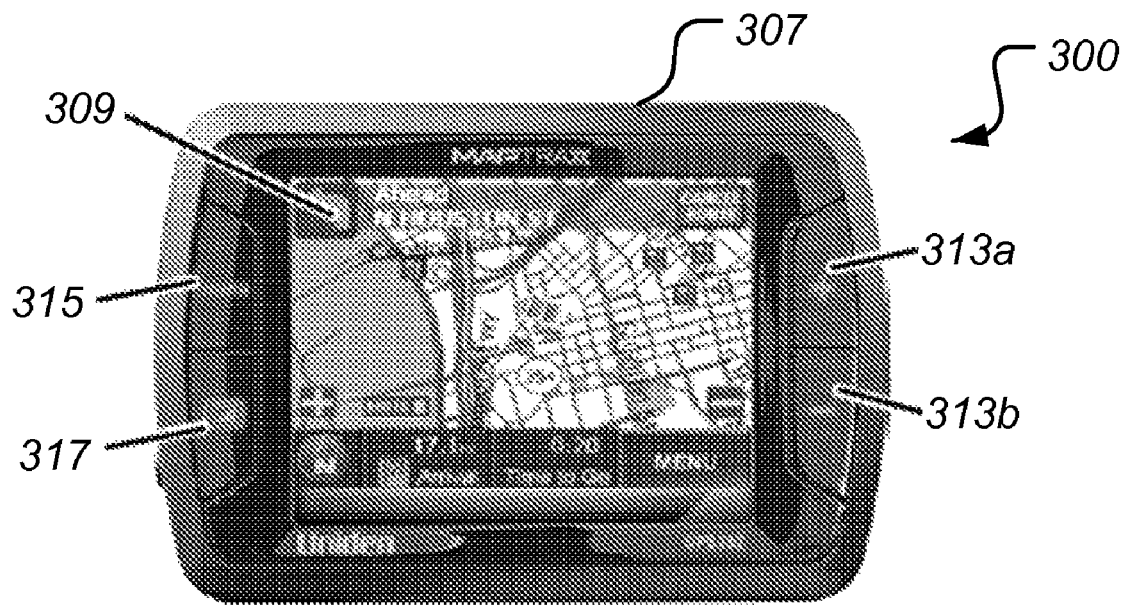
Figure 3B:
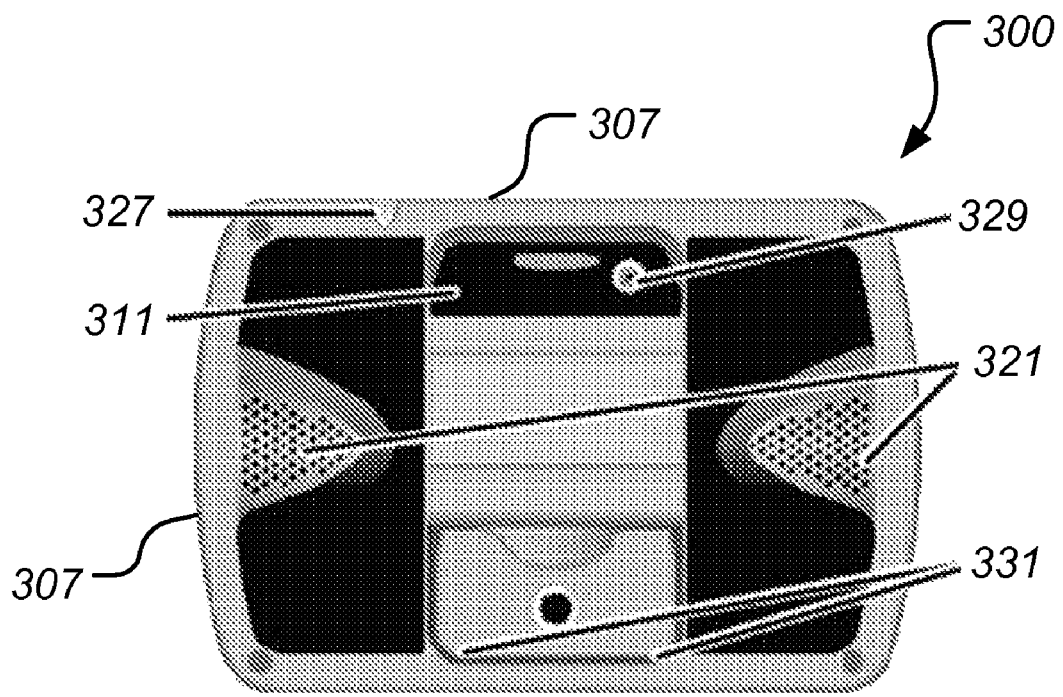
Figure 3C:
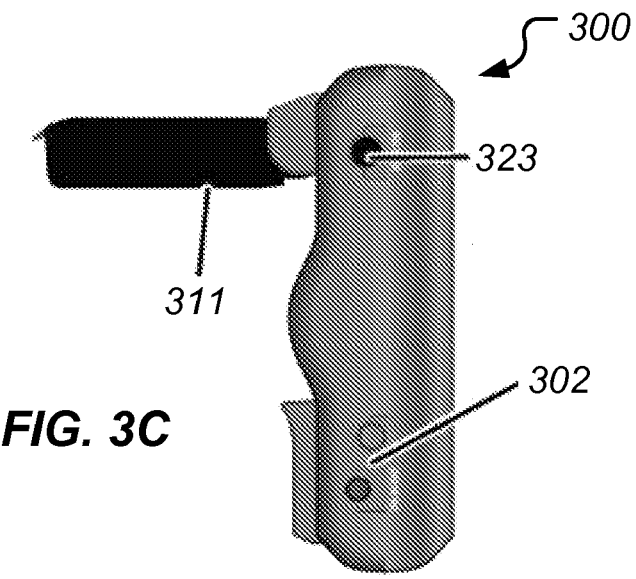
Figure 3D:
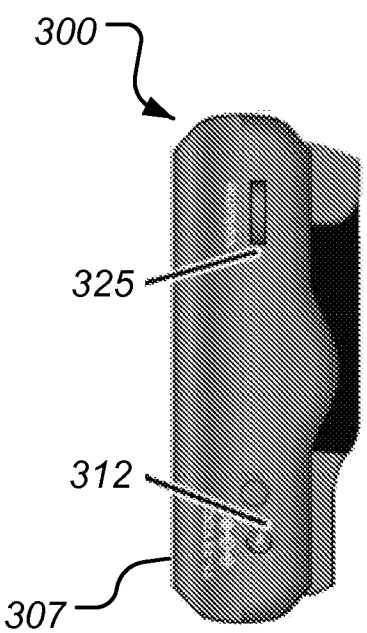
Figure 3E:
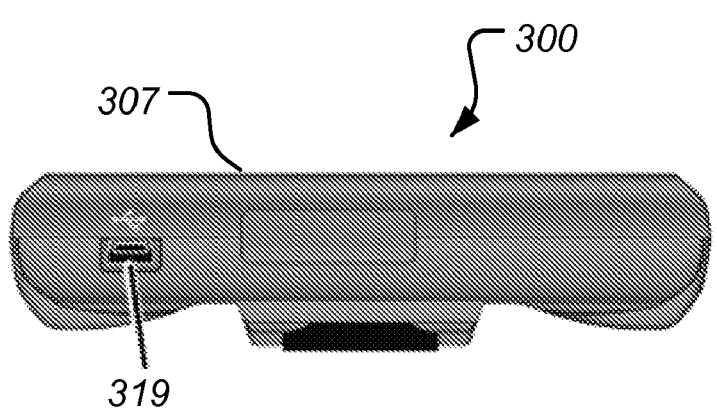

With reference now to the figures, the preferred embodiment of an apparatus 300 (see FIGS. 3A-3E) comprising a global positioning system (GPS) subsystem and a radar detection subsystem is illustrated. The apparatus functions in a distributed data processing environment. FIGS. 1 and 2 are diagrams of a data processing environment and a network data processing system, respectively, in which apparatus 300 and methods of using apparatus 300 may be implemented.

FIG. 1 is a pictorial representation of a network of data processing system 100 in which aspects of apparatus 300 may be implemented. Network data processing system 100 comprises a network 102 of computers. Network 102 is a communications medium formed by communication links between various devices and computers connected together within network data processing system 100. Network 102 may include a wide variety of connections, such as wired, wireless communication links, fiber optic cables, infrared communication links, microwave communication links, and other types of communication connections.

In the depicted example, a server 104, another server 106, and a digital storage unit 108 are connected to network 102. In addition, clients 110, 112, and 114 are connected to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. It should be understood that network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now also to FIG. 2, a block diagram of a data processing system 200 in which aspects of apparatus 300 may be implemented. Data processing system 200 is an example of a computer, such as server 104 or client 110 in FIG. 1, in which computer usable code or instructions implementing various processes for apparatus 300 may be located. In the depicted example, data processing system 200 employs a hub architecture including a north bridge and memory controller hub (NB/MCH) 202 that is connected to a south bridge and input/output (I/O) controller hub (SB/ICH) 204.

A processing unit 206, a main memory 208, and a graphics processor 210 are connected to NB/MCH 202. Graphics processor 210 may be connected to NB/MCH 202 through an accelerated graphics port (AGP). In the depicted example, a LAN adapter 212 is connected to SB/ICH 204. SB/ICH 204 comprises one or more data buses, such as data bus 238 and data bus 240. Buses 238 and 240 may be implemented using any type of communications fabric or architecture that provides for a transfer of data between different components or devices attached to the fabric or architecture.

A wide variety of peripheral devices and components may be coupled to NB/MCH 202 and SB/ICH 204. For example, an audio adapter 216, keyboard and mouse adapters 220, a modem 222, read only memory (ROM) 224, universal serial bus (USB) ports and other communications ports 232, and PCI/PCIe devices 234, and a super I/O (SIO) device 236 may be connected to SB/ICH 204 via bus 238. PCI/PCIe devices may include, for example, Ethernet adapters, add-in cards, and PC cards for laptop, notebook, and handheld computers. In general, PCI cards require a card bus controller, while PCIe cards do not. ROM 224 may be, for example, a flash binary input/output system (BIOS). In addition, one or more hard disk drives (HDD) 226 and/or one or more compact disk-read only memory (CD-ROM) drives 230 may be connected to SB/ICH 204 via bus 240. Hard disk drive 226 and CD-ROM drive 230 may use, for example, an integrated drive electronics (IDE) interface, a serial advanced technology attachment (SATA) interface, or any other suitable interface.

An operating system runs on processing unit 206 and coordinates and provides control of various components within data processing system 200. The operating system may include an object-oriented programming system that runs in conjunction with the operating system and provides calls to the operating system from specific programs or applications executing on data processing system 200. Furthermore, data processing system 200 may be a symmetric multiprocessor (SMP) system including a plurality of processors in processing unit 206. Alternatively, a single processor system may be employed. Instructions for the operating system, the object-oriented programming system, and applications or programs, are located on storage devices, such as hard disk drive 226, and may be loaded into main memory 208 for execution by processing unit 206. The processes are performed by processing unit 206 using computer usable program code, which may be located in a memory such as, for example, main memory 208, read only memory 224, a cache, such as is found in NB/MCH 202, or in one or more peripheral devices, such as hard disk drive 226. In some applications, it may be desirable that data processing system 200 be a personal digital assistant (PDA), which is configured with flash memory to provide non-volatile memory for storing operating system files and/or user-generated data.

Those skilled in the art will appreciate that the devices and components depicted in FIGS. 1 and 2 may vary depending upon the implementation. Other internal hardware or peripheral devices, such as flash memory, equivalent non-volatile memory, or optical disk drives and the like, may be used in addition to or in place of the hardware depicted in FIGS. 1 and 2. Also, the processes may be applied to a multiprocessor data processing system. Thus, it should be understood that FIGS. 1 and 2 are only exemplary and are not intended to assert or imply any limitation with regard to the architecture or environments in which aspects or embodiments of apparatus 300 may be implemented. Furthermore, in addition to taking the form of a PDA, data processing system 200 may take the form of many other physical configurations, including: tablet computers, laptop computers, telephone devices, handheld devices, and dash-mounted devices.

In the preferred embodiment, data processing system 200 is integrated with a GPS subsystem comprising a GPS receiver 250 and a GPS antenna 252. The GPS subsystem is connected through GPS receiver 250 to processing unit 206 via bus 238, SB/ICH 204, and NB/MCH 202.

Referring now also to FIGS. 3A-3E in the drawings, the preferred embodiment of apparatus 300 is illustrated. Apparatus 300 includes a main power switch 302, a housing 307, a touch-screen video display 309, a GPS antenna 311, a DC power port 312, and one or more other input, output, control, and data transfer devices, including display control buttons 313a and 313b, one or more software menu buttons 315, a display on-off switch 317, a data transfer port 319, one or more audio speakers 321, a microphone (not shown), an audio output port 323, and a volume control 325. A removable stylus 327 to aid in the inputting of data and the controlling of apparatus 300 may be releasably housed in or coupled to housing 307. Apparatus 300 includes one or microprocessors, digital memory, and software, for controlling the function and operation of apparatus 300. Apparatus 300 may be implemented as a data processing system, such as data processing system 200 in FIG. 2.

Touch screen display 309 may be used to control the function and operation of apparatus 300. Audio output port 323 may be used to connect headphones (not shown) to apparatus 300, or to redirect audio output signals from apparatus 101 to other electronic devices. Data transfer port 319 is preferably a universal serial bus (USB) port; however, it will be appreciated that data transfer port 319 may be any suitable wired or wireless means for transferring digital data between apparatus 300 and other electronic devices and data processing systems. GPS Antenna 311 may be extendable and retractable, for example by pivoting, twisting, folding, or telescoping, relative to housing 307. In addition, GPS antenna may include an antenna port 329 adapted to receive either an optional external GPS antenna or an optional antenna for receiving other types of analog or digital signals.

Housing 307 may include various means for connecting or attaching apparatus 300 to other objects. For example, apparatus 300 may include mounting holes 331 for attaching apparatus 300 to an adjustable arm support (not shown). The adjustable arm support may include a suction cup member that would allow apparatus to be mounted to the windshield of a vehicle. Housing 307 may include other suitable means for connecting apparatus 300 to other structures and devices, including mounting brackets, tabs, clips, and slots. Furthermore, it should be understood that apparatus 300 may be used as a stand-alone unit or may be installed into another device, such as a vehicle or another electrical device.

Figure 4:
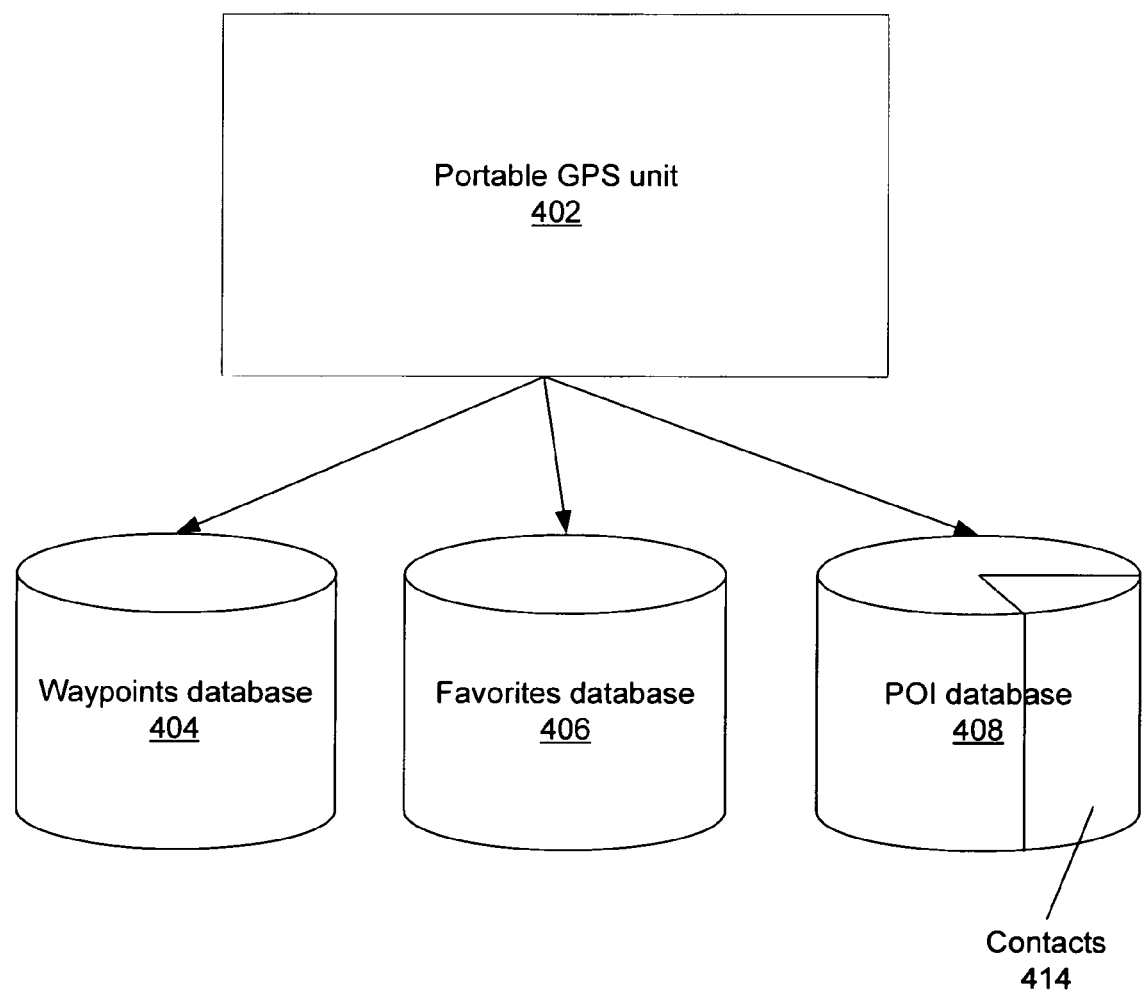
FIG. 4 is a block diagram of a system for automatically creating POIs from a contact list in accordance with the method and apparatus disclosed herein.

Referring now also to FIG. 4 in the drawings, a block diagram of the system for automatically creating POIs from a list of contacts for apparatus 300 is illustrated. A data processing system 410, which may be implemented as data processing system 200 in FIG. 2, is shown communicating with a GPS unit 402, which may be implemented as apparatus 300 of FIGS. 3A-3E. Data processing system 410 is communicating with GPS unit 402 via a data transfer port, such as data transfer port 319 in FIG. 3E. In an exemplary embodiment, data transfer port 319 is preferably a universal serial bus (USB) port. However, it will appreciated that the data transfer port may be implemented in various ways, including, but not limited to, any suitable wired or wireless means for transferring digital data between data processing system 410 and GPS unit 402, including Bluetooth, infrared signals, laser communication, fiber optic cables, and flash memory devices.

In the exemplary embodiment, GPS unit 402 stores data points for use with mapping software in three databases: a waypoint database 404, a favorites database 406, and a POI database 408. However, it should be understood that many other ways may be suitable for organizing information stored by GPS unit 402. For example, instead of one POI database 408, there could many separate databases or files each of which stores a specific type of POI, such as, for example, one database for airports only, a separate database for hotels only, or even a separate database for specific related POIs, such as a database for Hilton hotels only. Alternatively, waypoint database 404, favorites database 406, and POI database 408, may all comprise a single database. Furthermore, while the exemplary embodiment shows the information regarding POIs, waypoints, and favorites as being stored as databases, many other forms of storage are possible, including, storing as data files, text files, spreadsheets, application files, tables, and so on.

There is a wide variety of software that stores contact information, such as names and addresses for people and businesses, in digital address books. The data is stored in lists, files, and databases, including text files, database files, spreadsheets, xml formats, html formats, Java format, and e-mail and text-messaging applications, to name a few. The use of the term "address book" herein is not meant to limit the scope of apparatus 300 or any methods of its use.

GPS unit 402 is adapted to receive data for lists of contacts and contact information from many different types of address books. In the preferred embodiment, the address book data is transferred from another computing device to apparatus 300 via various data transfer means. In the preferred embodiment, the data for the list of contacts and contact information is transferred from the address book stored on the other computing device to apparatus 300 as one file, in a single batch; however, it will be appreciated that the data may be grouped together across multiple files or batches. Once the contact data has been transferred to apparatus 300, the data is converted into individual POIs and stored in a designated area of POI database 408, referred to herein as contacts 414. In the exemplary embodiment, GPS unit 402 automatically processes and stores the data for the list of contacts and contact information as a batch process. In an alternate embodiment, after receiving the data for the list of contacts and contact information, GPS unit 402 queries the user as to whether to store the received information as POIs. In another alternate embodiment, GPS unit 402 processes the received information according to user-specific instructions, such that only selected contact information is stored as POIs. In another alternate embodiment, GPS unit 402 pre-processes the received information in order to arrange the information according to user supplied requirements. As the data for the contact information is saved as POIs, graphical indicators to the location and distance to the contacts, even those contacts that are not currently displayable on the screen, can be shown on the video display 309.

Figure 5:
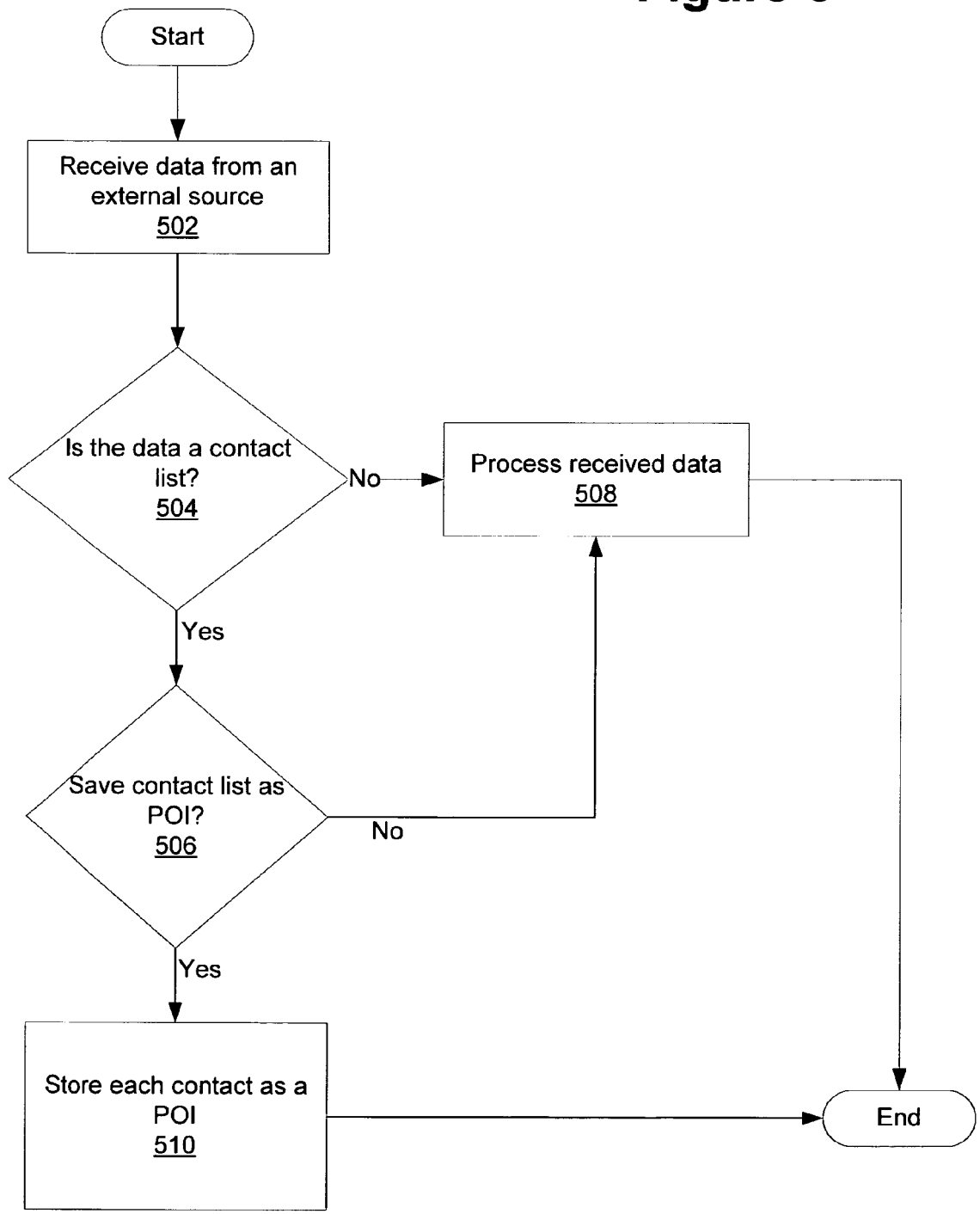
FIG. 5 is a flowchart of the operation of automatically creating POIs in a GPS system from a group of contacts in accordance with the method and apparatus disclosed herein.

Referring now also to FIG. 5 in the drawings, a flowchart depicting the procedure of automatically creating POIs for a group of contacts for apparatus 300 is illustrated. The procedure begins at step 502, in which a GPS unit, such as GPS unit 402 in FIG. 4, receives data from an external source. Typically, this data will be received through a data transfer port, such as data transfer port 319 in FIG. 3E. Next, in step 504, the data is tested to determine whether the data is a list of contacts. If the data is not a list of contacts, the procedure continues with step 508, in which the data is appropriately processed, followed by the ending of the procedure. On the other hand, if the data is determined to a list of contacts, then the procedure continues to step 506, in which the user is queried as to whether the user would like to save the list of contacts as POIs. If the user does not want to save the contacts as POIs, the procedure continues with step 508, in which the data is appropriately processed and the procedure ends. On the other hand, if the user does want to save the list of contacts as POIs, the procedure passes to step 510, in which the list of contacts is processed and saved, such that each contact in the list of contacts is saved as a separate POI, after which, the procedure ends.

Figure 6:
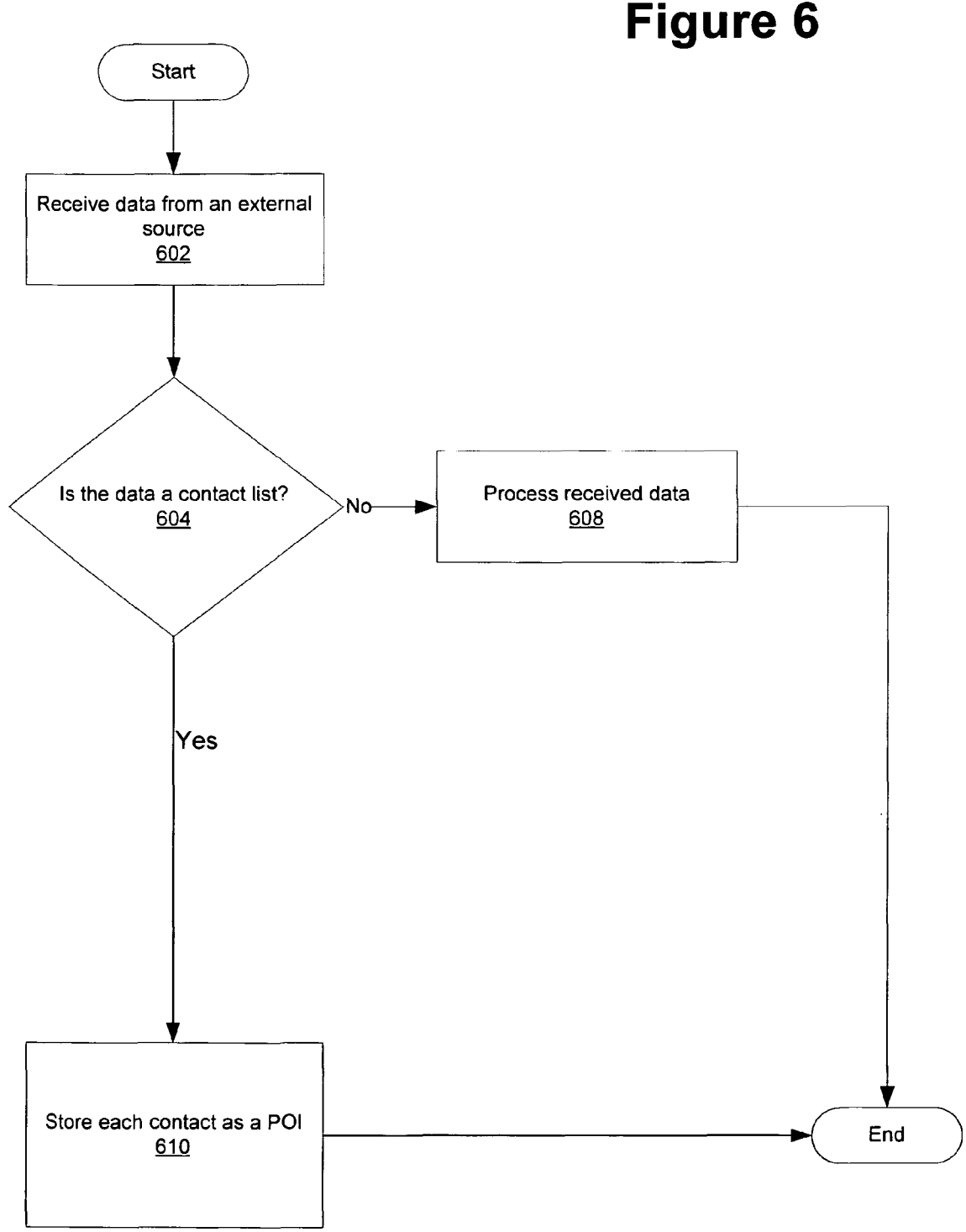
FIG. 6 is a flowchart of the operation of automatically creating POIs in a GPS system from a group of contacts in accordance with an alternate embodiment of the method and apparatus disclosed herein.

Referring now to FIG. 6 in the drawings, a flowchart of an alternative procedure of automatically creating POIs for a group of contacts for apparatus 300 is illustrated. The procedure of FIG. 6 is similar to the procedure of FIG. 5, with the exception that in the procedure of FIG. 6, a POI is automatically created and saved for each contact in the list of contacts, without the step of user intervention. Thus, the procedure begins at step 602, in which a GPS unit, such as GPS unit 402 in FIG. 4, receives data from an external source. Typically, this data will be received through a data transfer port, such as data transfer port 319 in FIG. 3E. Next, in step 604, the data is tested to determine whether the data is a list of contacts. If the data is not a list of contacts, the procedure continues with step 608, in which the data is appropriately processed, followed by the ending of the procedure. On the other hand, if the data is determined to a list of contacts, then the procedure passes to step 510, in which the list of contacts is processed and saved, such that each contact in the list of contacts is saved as a separate POI, after which, the procedure ends.

Figure 7:
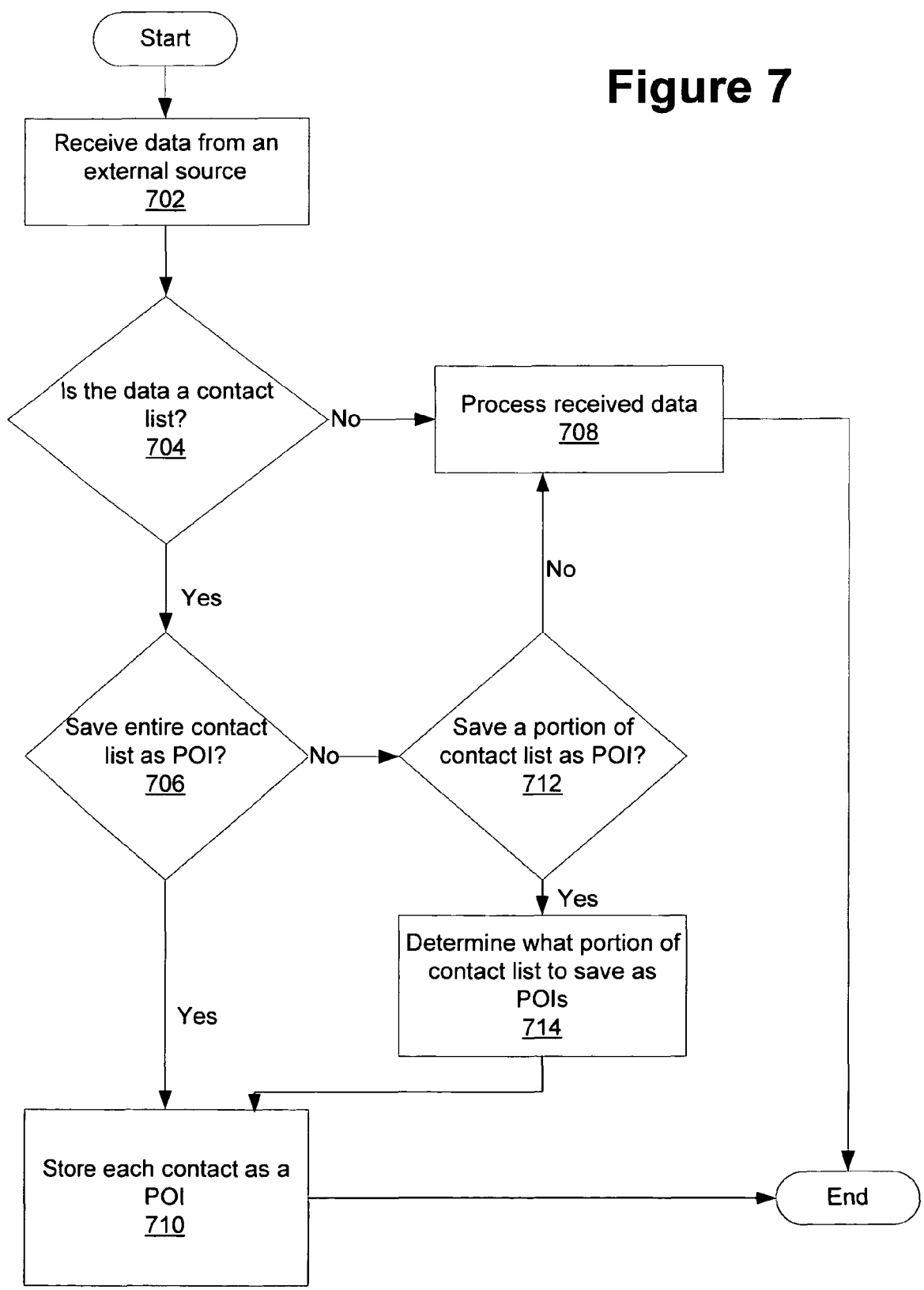
FIG. 7 is a flowchart of the operation of automatically creating POIs in a GPS system from a group of contacts in accordance with another alternate embodiment of the method and apparatus disclosed herein.

Referring now also to FIG. 7 in the drawings, a flowchart depicting another alternative procedure of automatically creating POIs for a group of contacts for apparatus 300 is illustrated. The procedure begins at step 702, in which a GPS unit, such as GPS unit 402 in FIG. 4, receives data from an external source. Typically, this data will be received through a data transfer port, such as data transfer port 319 in FIG. 3E. Next, in step 704, the data is tested to determine whether the data is a list of contacts. If the data is not a list of contacts, the procedure continues with step 708, in which the data is appropriately processed, followed by the ending of the procedure.

On the other hand, if the data is determined to a list of contacts, then the procedure continues to step 706, in which the user is queried as to whether the user would like to save the entire list of contacts as POIs. If the user responds in the affirmative, the procedure continues with step 710, in which the entire list of contacts is processed and saved, such that each contact in the list of contacts is saved as a separate POI, after which, the procedure ends. If the user responds to the query of step 706 in the negative, i.e., the user does not want to save the entire contact list as POIs, then the process continues with the follow-up query of step 712, in which the user is asked whether she would like to save a portion of the contact list as POIs. If the user chooses not to save any portion of the contact list as POIs, then the procedure continues with step 708, in which the data is appropriately processed, followed by the ending of the procedure. On the other hand, if the user chooses to save one or more of the contacts in the contact list as POIs, then the procedure passes to step 714, in which the user determines which contacts from the list of contacts to save as POIs. It will be appreciated that a wide variety of means for choosing various contacts from the list of contacts may be implemented, including check lists and pull-down lists. Once the user has selected which contacts to add as POIs, the procedure passes to step 710, in which the selected contacts from the list of contacts is processed and saved, such that each selected contact from the list of contacts is saved as a separate POI, after which, the procedure ends. It should be understood that the queries of steps 706 and 712 may be combined into a single query, such as by having the user select "all" contacts, or by having the user select individual contacts.

Thus, the difference between the alternative embodiments described in FIGS. 5 and 7 is that in FIG. 7, a user can choose to save only a portion of imported list of contacts as POIs. Further, the user can input criteria for how this portion is to be determined. For example, the user may choose to create POIs for only those contacts in a certain city, state, or zip code. Or, as another example, the list of contacts may be sorted alphabetically by last name or first name and only contacts within a certain letter range will be saved as POIs. It will be appreciated that the information in a list of contacts may be parsed or sorted in many different ways in order to make it quicker and easier for the user to select which contacts are to be saved as POIs. The present invention contemplates all such ways of sorting and parsing a list. The present examples are not to limit exemplary embodiments in any way.

Figure 8:
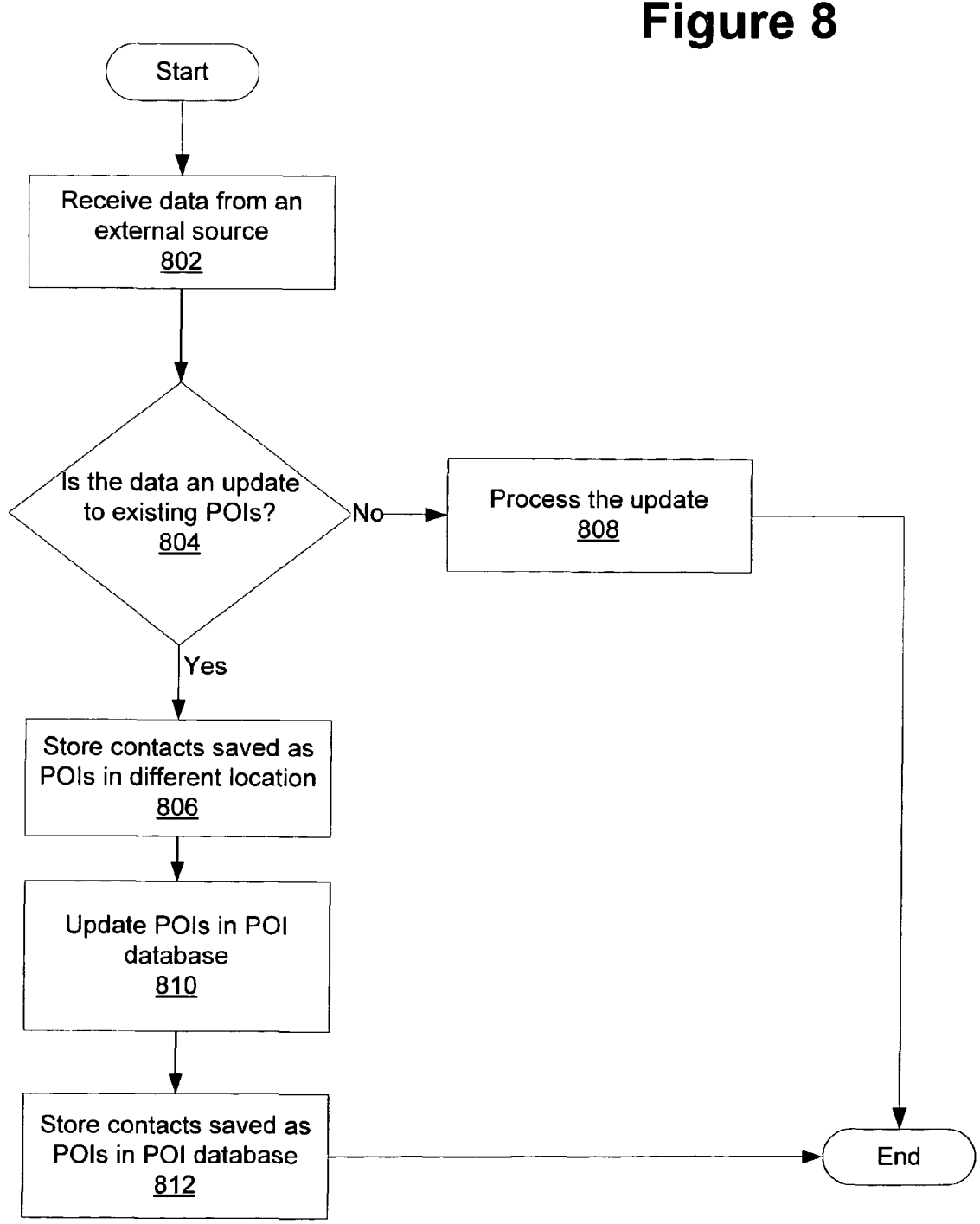
FIG. 8 is a flowchart of the operation of updating a list of POIs in a GPS system in accordance with the method and apparatus disclosed herein.

Referring now to FIG. 8 in the drawings, a flowchart depicting the procedure of updating a list of POIs in apparatus 300 is illustrated. The procedure begins at step 802, in which a GPS unit, such as GPS unit 402 in FIG. 4, receives data from an external source. Typically, this data will be received through a data transfer port, such as data transfer port 319 in FIG. 3E. Next, in step 804, the data is tested to determine whether the data is an update to existing POIs, or whether the data will affect any POIs created as a result of importing one or more lists of contacts. If the data is not an update to existing POIs and will not affect any POIs created as a result of importing one or more lists of contacts, the procedure continues with step 808, in which the update or data is appropriately processed, followed by the ending of the procedure. On the other hand, if the data is an update to existing POIs, or if the data will affect any POIs created as a result of importing one or more lists of contacts, the procedure passes to step 806, in which any POIs stored in database 408 that were formed as a result of importing a contact list, for example, contacts 414, are saved in a different location temporarily while the update is performed. The update of POI database 408 takes place in step 810. Next, in step 812, after POI database 408 has been updated, the POIs that were created as a result of importing lists of contacts are added to the updated POI database 408, after which the procedure ends. This operation prevents any POIs added as a result of importing lists of contacts from being inadvertently overwritten or deleted.

Thus, apparatus 300 provides significant advantages by allowing a user to create new POIs by importing an entire list of contacts in one step, as opposed to having to create each POI individually by entering the data from each contact one at a time. Furthermore, because the contacts are saved as POIs, the information remains in memory, even through updates to the mapping software, until deleted by the user. Once the contact information has been saved as a POI, it may be displayed and referenced on video display 309 in the same manner as preloaded POIs.

The foregoing description has been presented for purposes of illustration and description, and is not intended to be exhaustive or limited to the invention in the form disclosed. Many modifications and variations will be apparent to those of ordinary skill in the art.

I claim:

1. A method in a data processing system for creating points of interest for a global positioning satellite system, the method comprising the steps of:
   receiving data into the global positioning satellite system;
   determining if the data comprises a list of contacts;
   receiving input from a user indicating whether the user wants to save the list of contacts as points of interest;
   receiving a second input from the user indicating whether the user wants to save a portion of the list of contacts as points of interest;
   receiving additional input from the user indicating which portions of the list of contacts that the user wants to save as points of interest;
   creating a point of interest for in the global positioning satellite system for each contact of the portion of the list of contacts; and
   saving the points of interest;
   wherein the step of receiving additional user input is achieved by selecting from a criteria for parsing the portion of the list of contacts from the list of contacts, wherein the criteria includes one of a city, a state, a zip code, and an area code.

2. The method according to claim 1, further comprising the steps of:
   determining if the data comprises an update to existing points of interest;
   responsive to a determination that the data comprises an update to existing points of interest, storing the created points of interest in a different location;

updating the existing points of interest; and storing the created points of interest with the updated existing points of interest.

3. A computer program product stored on a computer readable medium for creating points of interest in a global positioning satellite system, the computer program product comprising:

computer usable program code stored on the computer readable medium for receiving data;

computer usable program code stored on the computer readable medium for determining if the data comprises a list of contacts;

computer usable program code stored on the computer readable medium for receiving input from a user indicating whether the user wants to save the list of contacts as points of interest;

computer usable program code stored on the computer readable medium for receiving a second input from the user indicating whether the user wants to save a portion of the list of contacts as points of interest;

computer usable program code stored on the computer readable medium for receiving additional input from the user indicating which portions of the list of contacts that the user wants to save as points of interest;

computer usable program code stored on the computer readable medium for creating a point of interest in the global positioning satellite system for each contact of the portion of the list of contacts;

computer usable program code stored on the computer readable medium for allowing the user to select from selected criteria for parsing the portion of the list of contacts from the list of contacts, wherein the criteria includes one of a city, a state, a zip code, or an area code; and computer usable program code for saving the points of interest.

4. The computer program product of claim 3, further comprising:

computer usable program code stored on the computer readable medium for determining if the data comprises an update to existing points of interest;

computer usable program code stored on the computer readable medium for, in response to a determination that the data comprises an update to existing points of interest, storing the created points of interest in a different location;

computer usable program code stored on the computer readable medium for updating the existing points of interest; and computer usable program code stored on the computer readable medium for storing the created points of interest with the updated existing points of interest.

\* \* \* \* \*